April 20, 1943. J. B. DE KUROWSKI 2,317,256
BOMB DROPPING DEVICE ADAPTED TO BE DROPPED FROM AIRCRAFT
Filed Nov. 20, 1940 2 Sheets-Sheet 1

Inventor:
Juljan Bronislaw de Kurowski.
by *[signature]*
Attorney.

April 20, 1943.   J. B. DE KUROWSKI   2,317,256
BOMB DROPPING DEVICE ADAPTED TO BE DROPPED FROM AIRCRAFT
Filed Nov. 20, 1940   2 Sheets-Sheet 2

Inventor:
Juljan Bronislaw de Kurowski
by  
Attorney.

Patented Apr. 20, 1943

2,317,256

UNITED STATES PATENT OFFICE 2,317,256

BOMB DROPPING DEVICE ADAPTED TO BE DROPPED FROM AIRCRAFT

Juljan Bronislaw de Kurowski, London, England

Application November 20, 1940, Serial No. 366,485
In Great Britain November 21, 1939

4 Claims. (Cl. 102—2)

The invention consists in a device intended to be dropped from aircraft and containing a plurality of bombs which it is adapted during its descent to drop automatically and sequentially at predetermined intervals, the device also embodying a parachute for retarding its descent, so that a comparatively large number of bombs may be dropped over a wide area.

According to the invention a bomb container having a bomb discharge aperture and adapted to be launched from the aircraft has attached to it a parachute adapted to carry it suspended in the air with the aperture facing downwards, and inside the container there is fixed a screw spindle directed towards the aperture and having mounted thereon a series of bomb carriers, each engaged with the screw thread for screw movement along the spindle. Detent or locking mechanism normally prevents such screw movement of the bomb carriers, but can be put out of action so that when the container is suspended from the open parachute, with the spindle directed downwards, the bomb carriers travel down the spindle by gravity and drop off the end thereof in succession. The detent mechanism may be put out of action by clockwork mechanism operating so that detents retaining the several bomb carriers are disengaged consecutively, starting with the detent at the lower end of the series. The clockwork may be started automatically, as for instance by the drag of the parachute when it opens.

An embodiment of the invention is shown in the accompanying drawings, in which.

Figure 1:
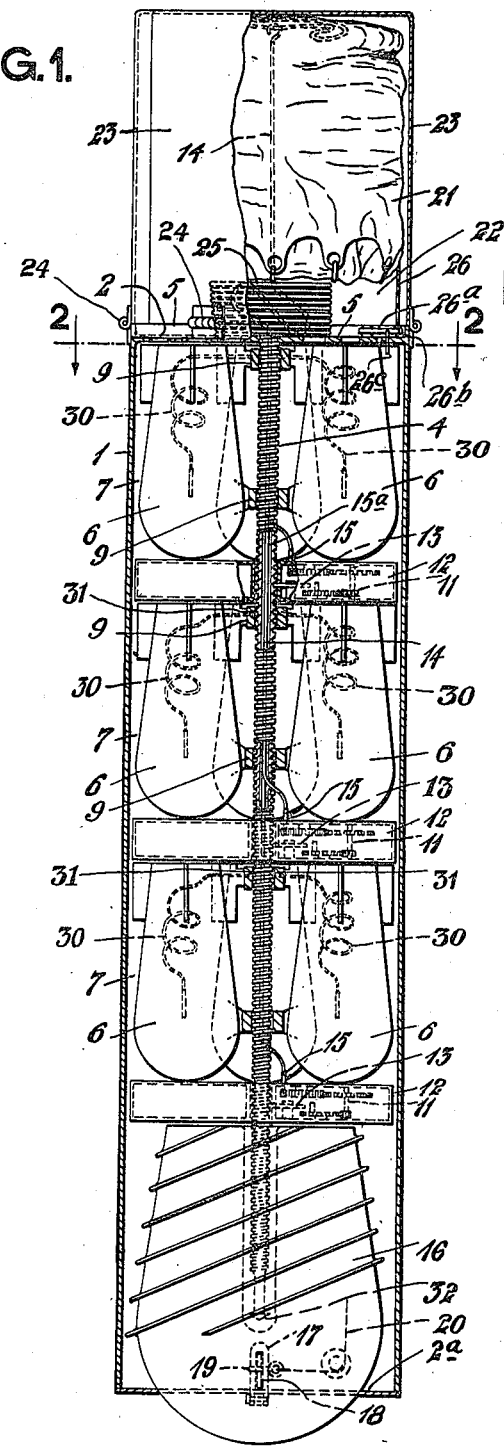
Fig. 1 is a central longitudinal section of the container designed to drop bombs, with the parts shown in normal position prior to the discharge of the container.
Figure 2:
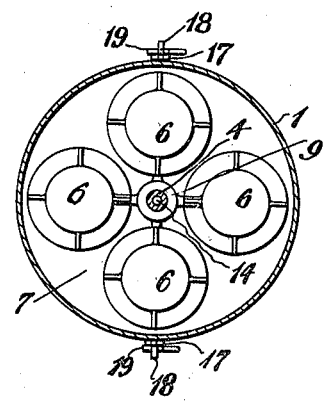
Fig. 2 is a section on the line II—II of Fig. 1.

Referring first to Figs. 1, 2, 3 and 4, I designates the container which is in the form of a cylinder provided with an end cap 2, and in said container is disposed a spindle 4 which is provided with a screw thread, is coaxial with the container and is suitably fixed to a plate 5 fixed inside the container. The bombs 6 are arranged in the cylinder preferably in superimposed sets 7 of four bombs, as shown in Fig. 2, each set consisting of two pairs, and the two bombs constituting a pair being connected by a bridge piece comprising a collar 9 having projections engaging with the screw thread of the spindle so that the said bridge pieces with the bombs carried thereby can, when released, rotate on the spindle and screw themselves down the spindle by gravity until they drop from the lower end of the latter. The two bomb pairs of each set are preferably set at 180° relatively to each other as shown in Fig. 2, so that the bombs of each set are arranged equidistant around the spindle in vertical pendent position with the bridge piece of one pair of bombs disposed above that of the other pair, as shown. The release of each set of bombs is effected independently of the others, each set having alloted to it for this purpose a timing mechanism, such as a delay action clockwork mechanism, controlling detent means and adapted to be set prior to the release of the cylinder, so that the several sets of bombs may be automatically released at predetermined intervals.

The detent means shown for each set of bombs comprises a clockwork 11 housed in a casing 12 supporting the set of bombs from below. The casings are slidable on the spindle 4 but each is normally held against descent by a detent in the form of a lever 13 which engages a recess in the spindle and is disengaged by a stud 13a on one of the wheels of the clockwork mechanism. The latter is automatically released by a cable 14 or equivalent element so that it commences to operate as the container drops from the aircraft, said cable being connected on the one hand to a part of the aircraft or, as shown, to the parachute and on the other hand the cable is connected to detent pins 15, engaging a part of the clockwork so as to normally lock it against operation. The cable 14 is disposed in a longitudinal bore 15a in the spindle and is connected to the pins 15 of the two uppermost sets of bombs by branch pieces 14a passing through bores in the spindle communicating with the bore 15a. Thus when the container is dropped from the aircraft and the parachute opens as hereinafter described, the pull of the cable 14 releases the several clockworks which after predetermined periods dependent on their setting release the appurtenant detents 13 so that the casings are free to drop sequentially and allow the sets of bombs to screw themselves down the spindle until they drop to earth. Alternatively the cable 14 may be connected at the upper end to the aircraft.

It will be seen that with this method of dropping bombs from aircraft the latter has time to get well out of range of anti-aircraft artillery, and in fact out of sight, by the time the anti-aircraft gun crew have been apprised by the explosion of a bomb of the presence of enemy aircraft, so that apart from the factor of safety thus ensured to the aircraft, an intimidating effect on the enemy due to the aircraft being invisible at the time of bombing is produced.

At the lower end of the container 1 below the lowermost set of bombs there may be a single large bomb 16 adapted to be aimed at an objective and discharged shortly after the discharge of the container. The detent means shown for holding this bomb 16 in position may consist of the cap 2a on the lower end of the container, said cap being held in position by flaps 17 hinged to the cap 2 and slotted to engage over lugs 18 on the container. The flaps are held in engaging position with the lugs 18 by pins 19 which are withdrawn from the lugs by a wire 20 connected at one end to the pins 19 and at the other end to the aircraft so that on withdrawal of the pins as a result of the pull on the cable the flaps and consequently the cap drop and allow the bomb 16 to descend.

Figure 3:
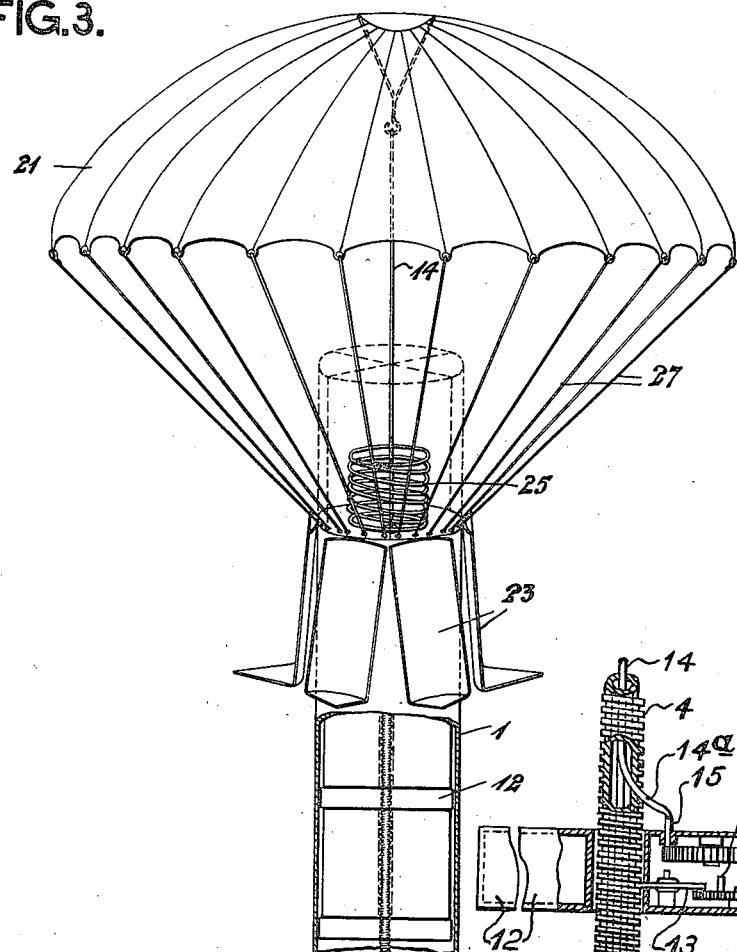
Fig. 3 is a side elevation of the upper part of the container with the descent retarding means in the form of a parachute in open condition.
Figure 4:
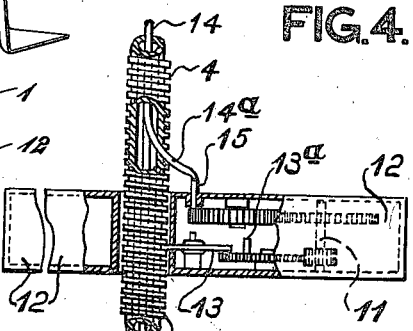
Fig. 4 is a vertical section, partly broken away, showing to a larger scale the means for putting out of action the detent restraining one of the bomb carriers.

21 designates the parachute housed in collapsed condition in a compartment 22 at the upper end of the container, and it may be caused to open automatically in any suitable manner, for instance as follows: The compartment 22 is formed by the perforated base plate 5 and L shaped flaps 23 hinged at 24 to the container. When the bomb 16 is dropped the rush of air through the lower open end of the container and thence upwards through the container and perforated plate 5 causes the parachute to ascend and open so that the flaps are pushed outwards and drop down as shown in Fig. 3; this opening of the parachute may be assisted by a coil spring 25 normally pressing upwards against the collapsed parachute and resting on the base 5. The cable 14 is connected at the upper end to the parachute as shown, so that when the latter opens it pulls the cable 14 upwards and thereby moves all the detent members 15 to unlock the clockwork mechanisms 11 simultaneously so that all the clockworks commence to run.

In order to prevent the parachute from falling into the hands of the enemy means may be provided for destroying it by causing it to catch fire after the release of the last pair of bombs; such means may consist, for example, of a slow burning fuze cord 26 adapted to be ignited by suitable ignition means.

The ignition means may, as shown, comprise a pivoted spring loaded arm 26a carrying a striker pin coacting with a cap 26b adapted to ignite the cord 26. By means of a stop pin 26c on one of the bombs of a pair of the uppermost set the arm 26a is normally held with its striker pin clear of the cap, but on the bomb descending the pin 26c releases the arm 26a so that the latter under the influence of its spring swings round and strikes the cap and thereby ignites the fuze cord. The latter may be disposed inside one of the parachute suspension cords 27.

Similar means may be provided for causing the bombs to explode should they fail to do so on impact, each bomb being provided for this purpose with a fuze cord 30 which is connected to the explosive charge and is automatically ignited as by caps 31 carried by the collars 9 striking a projection 32 on the lower end of the spindle 4 as the bombs drop from the container, said projection 32 acting as a striker.

The bombs may be provided with means, such as a whistle (not shown) or other similar device for creating sound during its descent with a view to creating a demoralising effect on the enemy by reason of the latter identifying the bombing device in question by the sound.

Figure 5:
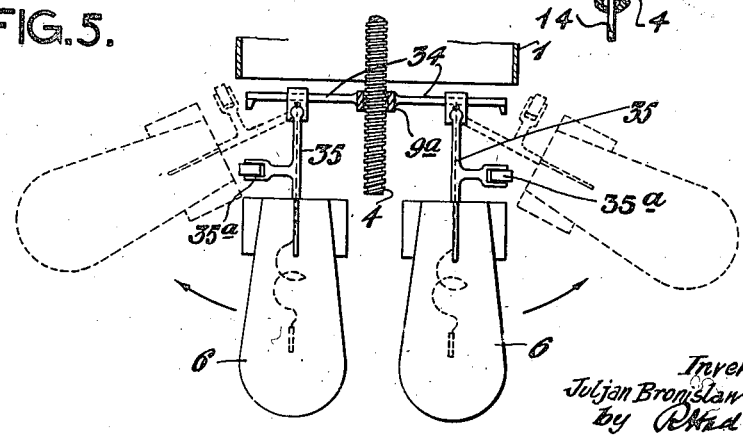
Fig. 5 shows in side elevation a modification of a detail.

Instead of the bombs being fixed to the collars as above described so that they drop from the container more or less straight to earth, they may be so arranged that as they emerge from the bottom of the container, and while revolving around the spindle, they are caused to swing outwards away from the latter by centrifugal force and finally fly off their carriers laterally. A suitable arrangement for this purpose is shown in Fig. 5, according to which the carriers for the bombs are in the form of collars or nuts 9a similar to the collars 9 and having laterally projecting arms 34, and the bombs being suspended from said arms by rods 35 or equivalent means which are slidable on said arms 34. The rods 35 are pivoted to the arms 34 so that they can swing away from the screw spindle, so that as the bombs emerge from the bottom of the container and while revolving around the screw spindle they are caused by centrifugal force to swing outwards and at the same time slide outwards until, reaching the outer extremities of the latter, they fly outwards into space.

Suitable detent means such as projections 35a on the rods 35 may be provided for restraining the bombs from swinging outwards until they are clear of the lower end of the container, said projections 35a engaging the inside of the container until they leave the bottom of the latter.

What I claim as my invention and desire to secure by Letters Patent of the United States is:

1. A device for dropping bombs from aircraft, comprising a container adapted to be launched from aircraft and having a bomb discharge aperture, a screw spindle fixed to the inside of said container and directed towards said aperture, a series of bomb carriers engaged with the screw thread of said spindle for screw movement along the same, detent mechanism associated with each carrier adapted to restrain said bomb carriers from movement along the said spindle, means in the container for putting said detent mechanism out of action, and a parachute attached to said container, adapted to hold the same in suspension with said discharge aperture facing downwards.

2. A device for dropping bombs from aircraft, comprising a container adapted to be launched from aircraft and having a bomb discharge aperture, a screw spindle fixed to the inside of said container and directed towards said aperture, a series of bomb carriers engaged with the screw thread of said spindle for screw movement along the same, a detent device associated with each bomb carrier, adapted to restrain said bomb carriers from movement along the said spindle, clockwork mechanisms in said container, adapted to disengage said detent devices successively and thereby release said bomb carriers in succession, for movement along said spindle, starting with the carrier nearest to the aperture, and a parachute attached to said container, adapted to hold the same in suspension with said discharge aperture facing downwards.

3. A device for dropping bombs from aircraft, comprising a container adapted to be launched from aircraft and having a bomb discharge aperture, a screw spindle fixed to the inside of said container and directed towards said aperture, a series of bomb carriers engaged with the screw thread of said spindle for screw movement along the same, a detent device associated with each bomb carrier, adapted to restrain said bomb carriers from movement along the said spindle, clockwork mechanisms in said container, adapted to disengage said detent devices successively and thereby release said bomb carriers in succession for movement along said spindle, starting with the carrier nearest to the aperture, and a parachute attached to said container, adapted to hold the same in suspension with said discharge aperture facing downwards and means for starting said clockwork mechanism actuatable by the drag of said parachute when it opens.

4. A device for dropping bombs from aircraft, comprising a container adapted to be launched from aircraft and having a bomb discharge aperture, a screw spindle fixed to the inside of said container and directed towards said aperture, a series of bomb carriers rotatable on said spindle and engaged with the screw thread thereof for screw movement along the same, detent mechanism associated with each carrier adapted to restrain said bomb carriers from movement along the said spindle, means in the container for putting said detent mechanism out of action so as to release said bomb carriers for rotation and movement along said spindle, bombs pivotally connected to said bomb carriers so that on emergence from said aperture they can swing outwards centrifugally from the axis of rotation of said carriers, said bombs being by such outward swing released from said bomb carriers, and a parachute attached to said container, adapted to hold the same in suspension with said discharge aperture facing downwards.

JULJAN BRONISLAW DE KUROWSKI.